United States Patent Office 2,879,232
Patented Mar. 24, 1959

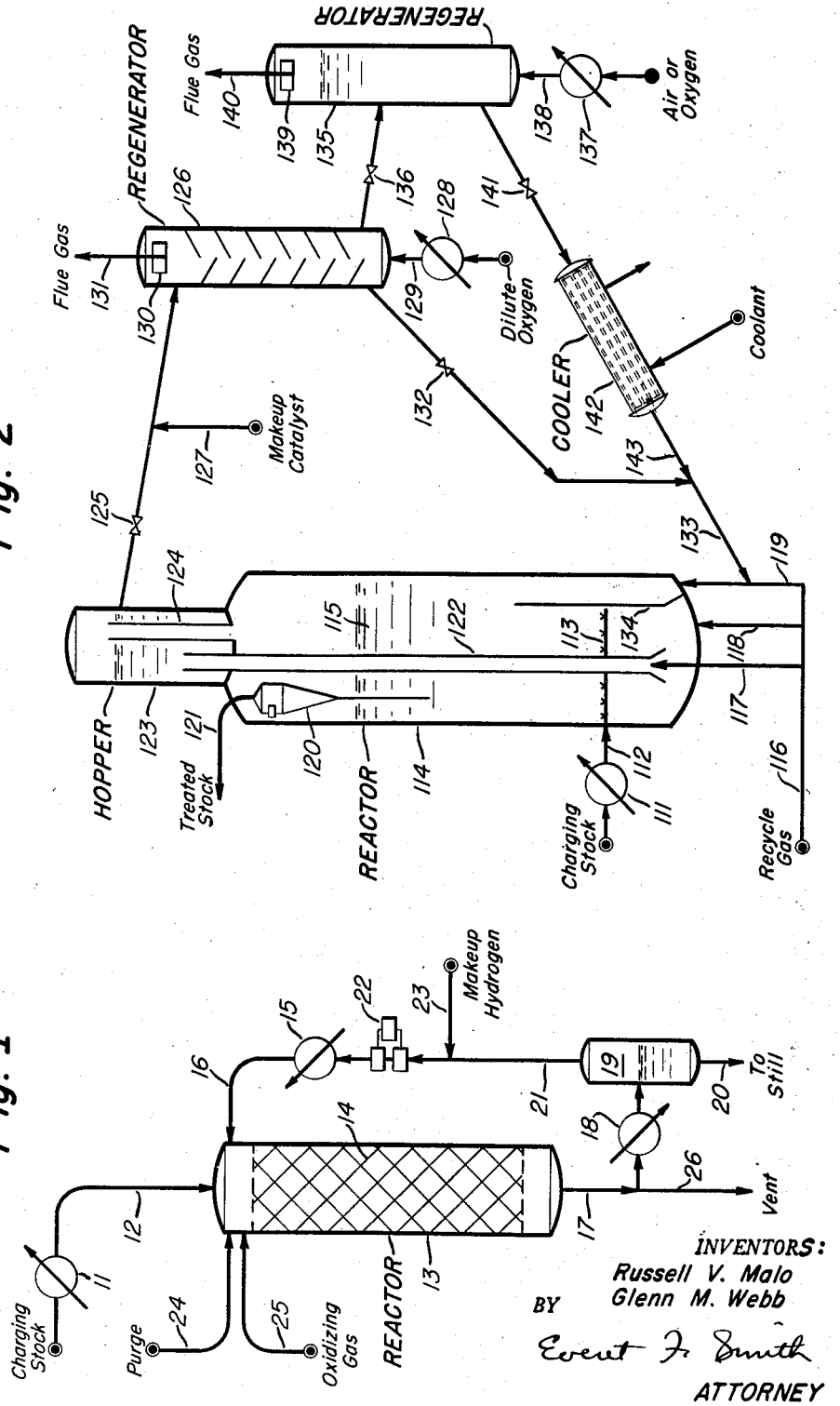

2,879,232

REGENERATION OF PLATINUM-TYPE HYDROFORMING CATALYSTS

Russell V. Malo, Munster, Ind., and Glenn M. Webb, Western Springs, Ill., assignors to Standard Oil Company, Chicago, Ill., a corporation of Indiana Application January 25, 1957, Serial No. 636,439

12 Claims. (Cl. 252—416)

This application is a continuation-in-part of application Serial No. 292,276, filed June 7, 1952, now abandoned.

This invention relates to the reforming of hydrocarbons and particularly to the hydroforming of hydrocarbons in the presence of catalysts of the noble-metal type. More specifically, our invention relates to the regeneration of platinum and/or palladium-containing catalysts after deactivation and carbonization thereof in the hydroforming of hydrocarbons.

The so-called "hydroforming" process, in its original form, employed a molybedena-alumina catalyst under conditions of elevated temperature and pressure for the reforming of hydrocarbons in the presence of hydrogen, and produced results that were greatly superior to the prior-art processes in terms of product quality. The yield-octane relationship, however, left something to be desired, and the catalyst became carbonized and deactivated very rapidly, so that frequent regeneration was necessary. These shortcomings of the process have been remedied to some extent by the recent development of platinum-type alumina-supported hydroforming catalysts. The new catalysts are capable of producing a substantially improved yield-octane relationship, and some of them are capable of producing substantially continuous operation for extended periods of time, when operated with carefully chosen charging stocks and rigidly controlled conditions of temperature, pressure, and space velocity. Among the catalysts of the new type are the halogen-containing platinum-alumina of Vladimir Haensel, described in U.S. Patent 2,479,109 (August 16, 1949) and the silica-alumina supported platinum and palladium catalysts of Frank G. Ciapetta, described in U.S. Patent 2,550,531 (April 24, 1951). All of the various catalysts, however, ultimately become deactivated by one mechanism or another, presumably by degradation, masking, or poisoning of the active centers, and we have observed that they cannot be satisfactorily restored to their initial activity or activity-maintenance by any of the techniques commonly employed for the revivification of hydroforming catalysts in general or of platinum catalysts in particular.

Another disadvantage of platinum-type catalysts lies in their unfortunate behavior pattern with respect to yield, selectivity, and carbonizing tendency over a range of pressures. At high reactor pressures in the range of about 500 to 750 pounds per square inch (hydrogen partial pressures above about 350 pounds per square inch), these catalysts have satisfactorily long lives if the hydroformer feed stock is carefully selected; however, at a given octane level the yield of reformate is low compared to the yield obtainable at reactor pressures around 200 pounds per square inch. At the lower pressures, on the other hand, platinum-type catalysts maintain their superior activity and selectivity for only relatively short periods; consequently, at such pressures a regenerative process must be used. It appears therefore that for the most advantageous utilization of platinum-type catalysts, a low-pressure hydroforming process should be used, coupled with an adequate method for reactivating the exhausted catalyst.

Platinum hydroforming catalysts may be regenerated by known techniques but such techniques have not been effective for preventing gradual loss of catalyst activity and an increase in activity decline rate after a large number of on-stream and regeneration cycles. Our invention makes it possible to substantially eliminate the gradual activity decline and increase in decline rate which has been previously encountered in platinum catalyst hydroforming systems, particularly those wherein on-stream conversion is at a pressure below 500 p.s.i.g., i.e. is in the range of 200–350 p.s.i.g.

We have now discovered a new technique whereby platinum-alumina and palladium-alumina hydroforming catalysts, and the various modifications thereof, can be successfully restored substantially to their initial catalytic state after being deactivated during exposure to hydrocarbon charging stocks under hydroforming conditions. In our invention, a platinum-type hydroforming catalyst is treated at elevated temperature to convert at least a portion of the platinum-group metal therein into a reducible derivative having a lower concentration of the metal and containing the metal at a valency greater than zero, thereby expanding the metal lattices or crystallites and setting up strain or rifts therein. The catalyst is then cooled rapidly to a temperature well below the crystallization point of the metal and of the said derivative, thereby accentuating and fixing the said strains or rifts. Finally, the said derivative is reduced to the metal in a catalytically active form.

In a broad embodiment, our invention comprises the steps of subjecting a deactivated and carbonized platinum-type hydroforming catalyst to oxidation under conditions effective to convert a substantial proportion of the catalytic metal into an oxide thereof while avoiding any substantial degradation of the catalytic metal or its derivative by physical or chemical interaction with the supporting material, then quickly cooling or quenching the catalyst to a temperature substantially below the recrystallization point of the catalyst metal, i.e., in the case of platinum (whose recrystallization temperature is about 860° F.), below about 800° F. or even below about 500° F., and thereafter contacting the catalyst with a hydrogen-containing gas under conditions of temperature and pressure effective to reduce the metal oxide to catalytically active metal.

In a more specific embodiment, our invention comprises the steps of subjecting a deactivated and carbonized catalyst to a mild oxidation with dilute oxygen to remove the readily oxidizable carbon therefrom, thereafter subjecting the treated catalyst to a more severe oxidation at a temperature above about 950° F., whereat substantially all of the residual oxidizable carbon is removed and a substantial proportion of the platinum or palladium is converted into an oxide thereof, then quenching the catalyst to ambient temperature, and finally exposing the oxidized catalyst to contact with a hydrogen-containing gas at a temperature in the hydroforming-process range. The catalyst is thereby restored to substantially the original activity and selectivity thereof when freshly prepared and to substantially its initial capacity for maintaining its activity and selectivity during contact with the charging stock.

The use of the defined cooling or quenching after severe oxidation of platinum catalyst at a temperature above about 950° F. has another important advantage in that it enables the beginning of the following on-stream cycle to be initiated at a relatively low temperature of the order, for example, of about 700 to 800° F. thus minimizing the danger of "hot spots" which may be encountered in start up operations with fresh or extremely active catalyst at temperatures normally employed for producing high octane number products.

While the nature of catalytic activity and the mechanism of catalytic processes are difficult to discern in most cases, we believe that the decrease in activity of platinum-type hydroforming catalysts may be due to a reorientation process through annealing of the platinum or palladium crystallites during exposure to the hydroforming temperature range, whereby the crystallites are caused to assume an unstrained state. In the unstrained state, the catalytic metals might be expected to be sluggish in their ability to bring about oxidation, reduction, and the several hydroforming reactions. In treating the catalytic metal according to our new process by oxidation, for example, the metallic bulk is increased because the oxides are less dense (as much as 20 percent less) than the metal; and when the oxide is thereafter subjected to quenching and to hydrogen treatment, the resulting shrinkage produces strains in the oxide and in the regenerated metal centers. In this condition of the catalyst, our tests have demonstrated that the metal exhibits the same hydroforming activity as when the catalyst was freshly prepared. While the foregoing theory is offered as a reasonable explanation of the mechanism whereby our invention achieves its improved results, it is to be understood that we do not wish to be bound thereby. Thus, our invention broadly comprises the steps of converting a deactivated platinum-group metal hydroforming catalyst into a reducible derivative containing the metal at lower concentration and at a valency greater than zero, and thereafter quenching and reconverting the said derivative into the catalytic metal.

One object of our invention is to effect an improvement in the reforming of hydrocarbons. Another object is to effect an improvement in catalysts for the hydroforming of hydrocarbons. A further object is to effect an improvement in the hydroforming of hydrocarbons with platinum-group metal hydroforming catalyst under coke-forming conditions. A specific object is to provide a means for the reactivation of platinum-alumina and palladium-alumina hydroforming catalysts, and variants thereof. A further specific object is to rejuvenate deactivated platinum-group metal hydroforming catalysts and to permit their reuse in the hydroforming process. An additional specific object is to restore the active catalytic centers of deactivated platinum-type catalysts. A subsidiary object is to remove carbon from platinum-type hydroforming catalysts without damage to the catalytic substances contained within such catalysts. A further subsidiary object is to remove from platinum-type hydroforming catalysts any materials of unknown composition which tend to mask the active centers present therein. Another object is to increase the useful life of platinum-group metal hydroforming catalysts. Other objects of our invention and its advantages over the prior art will be apparent from the present description thereof and from the appended claims.

The high-temperature treatment of catalysts with an oxide-forming agent according to our invention can successfully be applied to any platinum-type hydroforming catalyst, provided only that the treatment be carried out under circumstances which avoid fusing or sintering of the catalyst support, with consequent masking of the active catalyst centers or destruction thereof by compound or complex formation. To avoid such effects, we find it desirable to limit the carbon content of the catalyst to a maximum of around 0.1 percent by weight and the treatment temperature to a maximum of around 1300° F. Larger amounts of carbon may be tolerated on the catalyst during severe oxidation if provision is made to keep the catalyst temperature within safe limits during the extremely rapid combustion which occurs under severe oxidation conditions. In adiabatic fixed bed systems, the catalyst should therefore be subjected to regeneration according to our process before a substantially greater proportion of carbon has built up thereon, or alternatively it should be subjected to a preliminary oxidation or other treatment under relatively mild temperature conditions to reduce the carbon content to a level not greater than about 0.1 percent by weight. Such a preliminary oxidation can be carried out by contacting the catalyst with dilute oxygen at an average temperature above about 750° F. but not greatly above the recrystallization temperature of the platinum-group metal (860° F. in the case of platinum), suitably above 750 and below 900° F., and preferably between about 825 and 850° F. The oxidizing gas may be air, which is preferably diluted to some extent with flue gas or an inert gas such as nitrogen to an oxygen content between about 0.5 and 20 percent, preferably about 2 to 10 percent. We ordinarily employ an oxygen partial pressure between about 0.1 and 100 pounds per square inch, preferably between about 1 and 50 pounds per square inch, the higher oxygen partial pressures being employed at the lower temperatures and lower carbon contents. A contact time between about 0.2 and 5 hours is ordinarily sufficient to reduce the proportion of carbon to less than about 0.05 percent by weight. In fixed-bed reactors, we prefer to operate at a contact time between about 1 and 3 hours, whereas in fluidized-catalyst systems we prefer to operate at considerably shorter contact times, of the order of one minute or less up to one hour. The proportion of residual carbon varies somewhat according to the oxidation time and conditions and also according to the age of the catalyst. Fresh catalyst, for example, is readily oxidized to a carbon level around 0.01 percent, whereas during 1750 hours on stream in a cyclic hydroforming process employing only a low-temperature oxygen treatment at 20-hour intervals, as set forth above, we have found that the catalyst builds up and retains somewhat more than 0.05 percent by weight of refractory carbon.

In the embodiment of our process employing a high-temperature oxidation step, the catalyst is exposed to contact with oxygen at a temperature between about 950 and 1300° F., preferably 1000 to 1200° F., until substantially all of the oxidizable carbon is removed therefrom and a substantial proportion of the platinum or palladium is converted into an oxide thereof. The carbon content of the catalyst, the oxidation temperature, and the oxygen partial pressure of the oxidizing gas should be so chosen and correlated as to avoid any substantial fusion or sintering of the catalyst support. For this reason, we find it best to limit the carbon content of the catalyst undergoing high-temperature oxidation to not more than about 0.1 percent by weight. The oxygen content of the treating gas and the duration of treatment are not critical variables. Straight oxygen or air or a mixture thereof, with or without dilution with flue gas or an inert gas, may be employed as the regeneration gas. The time of contact may be as short as a few minutes (or even seconds in the treatment of fluidized catalysts), and the treatment can be continued for an extended period of time without impairment to the catalyst. We ordinarily prefer to carry out the high-temperature oxidation for a period between about 0.1 and 4 hours, whereby an oxidized catalyst is obtained containing 0.01 percent by weight of carbon or less and 10 to 20 percent or more of the platinum or palladium in the form of oxides.

After the high-temperature treatment, the catalyst is quenched to a temperature substantially below the crystallization temperature of the catalytic metal and of the derivative thereof produced in the high-temperature treatment. An oxidized platinum catalyst, for example, may be cooled to a temperature well below around 860° F., i.e. below 800° F. or even 500° F. and preferably to ambient temperatures around 0 to 100° F. The resulting shrinkage is believed to set up stresses in the catalytic material and to produce strains, rifts, fissures, fractures, and the like therein, creating and exposing centers of high or potentially high catalytic activity. Moreover, such action is expedited and the effects thereof are accentuated and preserved by the rapidity of the quenching action and by the extent to which the cooling is carried. The quenching operation may be carried out by rapidly cooling the reactor containing the catalyst, by withdrawing the catalyst and exposing it to air or other gas having a temperature within the desired range, or preferably by contacting the catalyst with a stream of gas having the desired temperature and flowing at a rate sufficiently high to effect a rapid removal of the sensible heat of the catalyst. We prefer to effect the cooling as rapidly as possible, for example in about 10 seconds to about 10 minutes; but the benefits of the operation are realized in part at substantially longer cooling periods, for example up to 3 hours or more.

Finally, the treated catalyst is subjected to contact with a hydrogen-containing gas at a temperature within the general hydro-forming range, between about 600 and 1000° F., whereby the metal oxide or other derivative is reconverted to the metal in a highly active form. The catalyst is then ready to be returned to the hydroforming process. Alternatively, the separate reduction step can be omitted, and the treated catalyst can be returned directly to the hydroforming process, wherein it will more conveniently receive a hydrogen treated effective to restore the catalytic metal centers.

Figure 1 illustrates an embodiment of our invention in a typical hydroforming process employing a fixed-bed reactor. A charging stock is vaporized in heater 11 and introduced through line 12 into the top of reactor 13. The charging stock is a conventional hydroforming feed, which may have a boiling range extending from 100 to 400° F. or even somewhat higher, owing to the regeneration feature of our process. Ordinarily a charging stock boiling within the range of about 200 to 380° F. is used. The reactor is packed with a pelleted platinum-alumina catalyst 14, preferably based on a Heard-type alumina gel, as described in Reissue Patent 22, 196 (October 6, 1942). The catalyst is prepared by commingling with the said gel a suspension of platinum sulfide equivalent to about 0.1 to 2 percent by weight, preferably about 0.6 percent, of platinum, calculated on the basis of dry $Al_2O_3$, and thereafter drying, crushing, pelleting, drying, and calcining. Other catalysts may be employed as described herein, comprising other supporting materials and other forms of platinum and/or of palladium, optionally with additional catalytic components. A recycle gas stream comprising essentially hydrogen is also introduced through heater 15 and line 16 into the top of reactor 13. The mixture of charging stock and recycle gas flows downward through the catalyst bed, where the hydroforming reactions are carried out at a temperature preferably between about 850 and 950° F., a pressure between about 50 and 1000 pounds per square inch, preferably around 200 pounds per square inch, a hydrogen rate of 2000 to 10,000 standard cubic feet per barrel of charging stock, and an hourly weight space velocity of 0.5 to 5. The reaction products emerge from the bottom of the reactor through line 17 and cooler 18 to knockout drum 19, from which the liquid products are withdrawn through line 20 to a conventional distillation system (not illustrated), and the product gas (essentially hydrogen) is recycled through line 21, compressor 22, heater 15, and line 16 to the top of reactor 13. The recycle gas may be purified by conventional means to remove $H_2S$ and/or hydrocarbons, and particularly to remove any olefins that may be present therein. Makeup hydrogen is added if required through line 23 to line 21.

After 10 to 200 hours on stream, the catalyst ordinarily becomes somewhat deactivated and accumulates in excess of 0.1 percent by weight of carbon. It is then subjected to regeneration according to our process. The flow of charging stock and recycle gas is stopped, the reactor is purged of charging stock and hydrogen by means of flue gas or an inert gas introduced into the top of the reactor through line 24, and a stream of air, diluted with flue gas or nitrogen to an oxygen content between about 2 and 10 percent, is introduced at atmospheric or somewhat elevated pressure and a space velocity around 1000 volumes per volume of catalyst-filled reactor space per hour into the top of the reactor through line 25. The dilute oxygen stream flows downward through the catalyst bed, which is maintained at a temperature above about 750 and below 860° F. by means of cooling tubes (not shown). Carbon is burned from the catalyst by this means, and is ordinarily reduced to a level below about 0.05 percent by weight in a treating time of about 1 to 3 hours. Flue gas leaves the bottom of the reactor through lines 17 and 26. The proportion of carbon dioxide in the flue gas is a convenient indication of the extent of carbon removal. When the proportion of carbon dioxide in the flue gas drops abruptly or reaches a level of around 0.1 percent, the primary oxygen treatment has reached a satisfactory point. The catalyst is then subjected to a second oxygen treatment under more severe conditions, as described hereinabove. In the second oxidation, we ordinarily employ air or oxygen or a mixture thereof, and treat the catalyst at a temperature preferably between 1000 and 1200° F. for a period of about 1 to 24 hours, the carbon content of the catalyst being ordinarily reduced thereby to less than about 0.01 percent by weight. A stream of air at room temperature is then introduced through line 24, and the catalyst is cooled thereby to a temperature below 500° F. within a period of less than 5 minutes and to a temperature below 100° F. within less than 3 hours.

The catalyst is finally purged with flue gas introduced through line 24, the reactor is repressured with hydrogen or recycle gas, the catalyst is exposed to hydrogen or recycle gas at 850 to 950° F. for a period of 0.1 to 1 hour, and the hydroforming cycle is resumed, the catalyst being now restored to substantially its original levels of activity and selectivity and to its original capacity for maintaining its activity and selectivity.

Figure 2 illustrates an embodiment of our invention employing a fluidized-catalyst system. A charging stock is vaporized in heater 111 and introduced through line 112 and sparger or grating 113 into a lower part of reactor 114. The reactor is charged with a finely divided catalyst 115 of such particle size as to permit satisfactory fluidization. The catalyst may suitably be platinum-alumina, palladium-alumina, platinum-titania-alumina, or the like, as described elsewhere herein. The catalyst is fluidized by means of the vaporized charging stock and by means of recycle gas, predominantly hydrogen, introduced into the reactor through lines 116, 117, 118, and 119. The recycle gas also serves to strip hydrocarbons from the catalyst in the lower part of the reactor, prior to withdrawal of the catalyst for regeneration. The hydroforming reaction is carried out at a temperature between about 850 and 950° F., a pressure between about 50 and 1000 pounds per square inch, preferably around 200 pounds per square inch, a hydrogen rate of 2,000 to 10,000 standard cubic feet per barrel of charging stock, an hourly weight space velocity of 0.5 to 5, and an average holding time for the catalyst within the reactor between about 10 and 200 hours, preferably 20 to 40 hours. The catalyst-to-oil ratio is fixed by the above definition of space velocity and catalyst holding time. The vaporous reaction products pass from the reactor through cyclone system 120 and line 121 to a conventional recovery system (not illustrated), an important feature of which is the separation and return of the product gas (essentially hydrogen) as recycle gas through line 116.

Catalyst is withdrawn continuously from reactor 114 at a rate adjusted to give the desired holding time in the reactor, to keep the catalyst activity and selectivity at the desired level, and to produce an average coke level on the catalyst particles in excess of 0.1 percent by weight and preferably less than about 2 percent. Withdrawal is effected by gas-lift from the bottom of the reactor, recycle gas flowing through line 117 into the bottom of riser 122 and upward, carrying with it a quantity of catalyst into hopper 123 wherein the catalyst is disengaged and from which the gas stream returns through downcomer 124 to the free space at the top of the reactor.

The withdrawn catalyst flows from hopper 123 through valved line 125 into regenerator 126, makeup catalyst being added as required through line 127. The regenerator is preferably a cascade-type plate column, so that a countercurrent contact between catalyst and oxidizing gas can be achieved, avoiding any substantial intermixing of treated and untreated catalyst within the regenerator, and permitting the withdrawal of fully treated catalyst from the bottom. Within regenerator 126, the catalyst flows downward countercurrent to a stream of dilute oxygen at a temperature preferably between about 825 and 850° F., a contact time between about 0.5 and 10 minutes, and a pressure, as a matter of operating convenience and economy, approximately the same as in reactor 114, between about 50 and 1000 pounds per square inch. The temperature may be maintained within the desired limits by an internally mounted waste-heat boiler, not shown. The regenerating gas, introduced through heater 128 and line 129, is air, which is preferably diluted to some extent with flue gas or an inert gas such as nitrogen to an oxygen content between about 0.5 and 20 percent, preferably about 2 to 10 percent. Flue gas leaves the regenerator through ceramic filters 130 and line 131. The treated catalyst, ordinarily containing less than about 0.05 percent by weight of residual carbon, emerges in part from a lower portion of regenerator 126 through valved line 132, and is recycled through lines 133 and 119 to reactor 114. The recycled catalyst is introduced into a lower portion of the reactor, segregated by baffle 134, wherein it is fluidized and reduced by recycle gas flowing through line 119, and is commingled thereby with the main body of the catalyst within the reactor. Baffle 134 may be extended if desired to the top of the dense-phase catalyst bed, or an equivalent internal or external conduit may be substituted therefor.

On continued use, the catalyst gradually loses activity and selectivity, even though subjected to the reactivation conditions employed in regenerator 126, owing, we believe, to the gradual build-up of difficultly removable carbon, and to the annealing and destruction of the catalytic metal crystallites. These effects are overcome and the catalyst is maintained at more nearly constant activity by diverting a portion of the treated catalyst from regenerator 126 to a second regenerator 135, where it is subjected to a supplemental regeneration under more severe conditions. For this purpose, a portion of the treated catalyst from regenerator 126 is withdrawn through valved line 136 to regenerator 135. The proportion of catalyst thus withdrawn ordinarily ranges from about 1 to 20 percent of the catalyst oxidized under mild conditions; but it is desirable at times to send the entire stream of catalyst from the mild regenerator to the severe regenerator, especially when treating charging stocks which give rise to excessive coke formation. Regenerator 135 may be a conventional unit containing a single bed of fluidized solids, or it may be a cascade-type plate column, or the like. Within the regenerator, the catalyst is subjected to a temperature of 950 to 1300° F., preferably between about 1000 and 1200° F., a pressure approximately the same as in regenerator 126 (50 to 1000 pounds per square inch), and a holding time between about 0.1 and 36 hours, preferably 12 to 24 hours, varying inversely with the temperature employed. The temperature may be held at the desired level by an internal waste-heat boiler, not shown. Provision may be made, if desired, for externally recycling the catalyst from the bottom to the top of the regenerator. Regeneration gas enters the bottom of regenerator 135 through heater 137 and line 138. This gas is air or oxygen, or air enriched with oxygen. Flue gas leaves the regenerator through ceramic filters 139 and line 140. The regenerated catalyst, ordinarily containing less than about 0.01 percent carbon, emerges from a lower portion of regenerator 135 through valved line 141 to cooler 142. Within the cooler, its temperature is rapidly reduced below about 500° F., preferably below about 100° F., by indirect heat exchange with a coolant liquid or gas. The catalyst is then recycled through lines 143, 133, and 119 to reactor 114.

While Figures 1 and 2 describe the application of our new process to the treatment of fixed-bed and fluidized catalysts, it will be apparent that the process is equally applicable to the regeneration of other forms of catalysts, employed in other types of catalytic apparatus. For example, the catalyst can be used in the form of a moving bed, in which the charging stock and catalyst are preferably passed in countercurrent flow, and the exhausted catalyst is withdrawn and regenerated according to our technique, preferably also in a moving bed. Other alterations and modifications will be apparent to those skilled in the art.

Our process is applicable broadly to the regeneration of hydroforming catalysts containing platinum or palladium as the essential component thereof. Such catalysts are generally supported upon a base consisting essentially of alumina, silica-alumina, or alumina plus a third component such as a fluoride, a chloride, boria, titania, chromia, an oxide of phosphorus, vanadia, or the like. The platinum is commonly employed in a proportion between about 0.1 and 2 percent by weight, based on the dry supporting material, preferably about 0.6 percent. Additional components such as those of the group set forth above, are commonly employed in the proportion of about 0.1 to 10 percent by weight, based on dry $Al_2O_3$.

In the preparation of a typical hydroforming catalyst which, after being deactivated and carbonized during exposure to a hydrocarbon charging stock under hydroforming conditions, is capable of being regenerated according to our process, a mixture of platinum and alumina is prepared, and the mixture is dried and calcined. The alumina can be employed in any of a large variety of forms, such as alumina hydrosol, alumina hydrogel, alumina xerogel, alumina monohydrate, sintered alumina, and the like, all of which can be prepared according to methods described in the prior art. The alumina should preferably be in substantially pure form, and in particular should not include iron, manganese, nickel, cobalt, or compounds thereof. The alumina is commingled with platinum in the form of a platinum compound such as chloroplatinic acid, platinum tetrachloride, or the like, or a solution thereof, or preferably a stable colloidal suspension of a platinum sulfide. To this mixture may optionally be added a third component of the group set forth above, or a compound affording such a component. The mixture of catalyst components is optionally dried in part, suitably at a temperature between about 200 and 400° F. for a period between about 4 and 24 hours, and is then calcined at a temperature between about 800 and 1200° F. for around 2 to 8 hours or more. Alternatively, the catalytic mixture can be contacted with hydrogen or a hydrogen-containing gas at a temperature between about 300 and 600° F. for about 4 to 12 hours or more prior to the said calcining step, or the calcining step itself can be carried out in the presence of hydrogen or a hydrogen-containing gas. As a further alternative, the effect of the calcining treatment can be achieved during the utilization of the catalyst at elevated temperature and pressure in the hydroforming of hydrocarbons.

Hydroforming catalysts of the above type can be prepared in any of the various mechanical forms required by various types of hydroforming processes. Either before or after calcination, the catalyst can be broken into lumps or granules, or it can be ground into a fine powder, suitably for use in the suspensoid or fluidized-solids processes. Or it can be formed into pills, pellets, or other suitable shapes, preferably prior to the calcination step. In this case, the partially dried catalytic mixture is ground to a powder, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about ⅛" x ⅛" to ½" x ½" are highly satisfactory for the most purposes. The shaped masses can then be hydrogen-treated and/or calcined, as set forth above.

Our invention will be more fully understood from the following specific examples:

Example I

Four kilograms of $AlCl_3.6H_2O$ were dissolved in 25 liters of distilled water, and the resulting solution was adjusted to pH 8 by stirring and adding a sufficient quantity of aqueous 10 percent ammonium hydroxide. A precipitate of aluminum hydroxide was formed thereby, and was separated from the aqueous liquor by filtration. The precipitate was washed by slurrying six times in 21-liter portions of distilled water at 150° F. The resulting salt-free solid was suspended in 11 liters of distilled water, and the suspension was divided into six aliquot parts, each of which contain 141 grams of $Al_2O_3$.

A suspension of platinum sulfide was prepared by adding 12 milliliters of aqueous ammonium polysulfide to 672 milliliters of an aqueous solution of platinum chloride containing 5.07 grams of platinum.

The platinum sulfide suspension was commingled with the alumina suspension, and the resulting mixture was dried over night at 185° F., then further dried at 350° F. The resulting cake was ground to pass 30 mesh, mixed with 4 percent "Sterotex" (a hydrogenated coconut oil), formed into ⅛-inch pellets, and calcined in air at 900° F. for about 4 hours. The completed catalyst contained 0.6 percent platinum, based on dry $Al_2O_3$.

A portion of the completed catalyst, when tested in the hydroforming of a Mid-Continent virgin naphtha at 200 pounds per square inch, a liquid hourly space velocity of 2, and a once-through hydrogen rate of 5,000 cubic feet per barrel of feed, required a temperature of 880° F. to produce an 85-octane (CFR–R) $C_5$—400° F. gasoline, and the gasoline was produced in 86.0 percent yield with a carbon deposition of 1.5 percent based on the catalyst weight.

Another portion of the catalyst was subjected to a life test involving alternate exposure to charging stock under hydroforming conditions for twenty hours and subsequent regeneration by oxidation and hydrogenation. In the hydroforming stage, Mid-Continent naphtha was contacted at 840 to 960° F., 200 pounds per square inch gauge, 2 liquid hourly space velocity, and 5,000 cubic feet of recycle gas per barrel of feed. At the end of 20 hours on stream, the flow of oil and hydrogen was stopped, the reactor pressure was reduced to atmospheric, the reactor was purged with nitrogen, and the catalyst was contacted with a 2 percent mixture of oxygen in nitrogen at 850° F. until the $CO_2$ content of the flue gas fell below 0.1 percent. The reactor was again purged with nitrogen, and the catalyst was reduced by contact with hydrogen for three hours, the temperature and pressure being meanwhile gradually raised to the hydroforming level. A new cycle of hydroforming and regeneration was then started.

After 253 hours on stream and 14 regenerations, a portion of the catalyst was tested without regeneration for five 20-hour periods. During the first 20-hour period, the total $C_5$—400° F. product had a CFR–R octane number of 91.5; and during the last 20-hour period, 72.5.

A second portion of used catalyst was subjected to a mild oxidation as in the previous cycles and was then treated with pure oxygen at 1060–1080° F. for 24 hours. The resulting oxidized catalyst was quenched to room temperature in around 5 minutes, and was then reduced in hydrogen at 850° F. The treated catalyst, when the hydroforming operation was resumed at 960° F., yielded a $C_5$—400° F. product having an octane number of 100.

A third portion of used catalyst was subjected to a mild oxidation as in the previous cycles was then treated with pure oxygen at 1060–1080° F. for 24 hours. The resulting oxidized catalyst was cooled to 850° F. over a period of 3 hours, and was then reduced in hydrogen at 850° F. The treated catalyst, when the hydroforming operation was resumed at 960° F., yielded a $C_5$—400° F. product having an octane number of 97. The same results were obtained when a fourth portion of the used catalyst was oxidized at 1060–1080° F. with air instead of pure oxygen.

Example II

Four kilograms of $AlCl_3.6H_2O$ were dissolved in 25 liters of distilled water, and the resulting solution was adjusted to pH 8 by stirring and adding a sufficient quantity of aqueous 10 percent ammonium hydroxide. A precipitate of aluminum hydroxide was formed thereby, and was separated from the aqueous liquor by filtration. The precipitate was washed by slurrying six times in 21-liter portions of distilled water at 150° F. The resulting salt-free solid was suspended in 11 liters of distilled water, and the suspension was divided into six aliquot parts, each of which contained 141 grams of $Al_2O_3$.

Titanium tetrachloride (0.83 gram) was dissolved and hydrolyzed in distilled water to form a slurry of titanium hydroxide.

A suspension of platinum sulfide was prepared by adding two milliliters of aqueous ammonium polysulfide to 112 milliliters of an aqueous solution of platinum chloride containing 0.845 gram of platinum.

The titanium hydroxide slurry was commingled with one of the aliquot portions of the alumina suspension, the platinum sulfide suspension was added thereto, and the resulting mixture was dried over night at 185° F., then further dried at 350° F. The resulting cake was ground to pass 30 mesh, mixed with 4 percent "Sterotex" (a hydrogenated coconut oil), formed into ⅛-inch pellets, and calcined in air at 900° F. for about 4 hours. The completed catalyst contained 0.25 percent by weight $TiO_2$ and 0.6 percent platinum, based on dry $Al_2O_3$.

A portion of the catalyst was tested in the hydroforming of a Mid-Continent virgin naphtha over a range of temperatures at 200 pounds per square inch, a liquid hourly space velocity of 2, and a once-through hydrogen rate of 5,000 cubic feet per barrel of feed, and the resulting data were plotted. From the plots it was determined that a temperature of 881° F. was required to produce an 85-octane (CFR–R) $C_5$—400° F. gasoline, and that the gasoline was produced in an 84.5 percent yield with a carbon deposition of 0.96 percent based on the catalyst weight.

A life test was thereafter carried out on a second portion of the catalyst, involving alternate exposure to charging stock under hydroforming conditions for twenty hours and subsequent reactivation by mild oxidation and hydrogenation. In the hydroforming stage, Mid-Continent naphtha was contacted at 933° F., 200 pounds per square inch, gauge, 2 liquid hourly space velocity, and 5,000 cubic feet of once-through hydrogen per barrel of feed. During the first 20-hour on-stream period, the total $C_5$—400° F. product had a CFR–R octane number of 96. At the end of 20 to 22 hours on stream, the flow of charging stock and hydrogen was stopped, the reactor pressure was reduced to atmospheric, the reactor was purged with nitrogen, and the catalyst was contacted with a 2 percent mixture of oxygen in nitrogen at 850° F. until carbon dioxide substantially disappeared from the flue gas. The reactor was again purged with nitrogen, and the catalyst was reduced by contact with hydrogen for three hours, the temperature and pressure being meanwhile gradually raised to the hydroforming level. A new cycle of hydroforming and regeneration was then started.

During fifty of the foregoing cycles, the catalyst was observed to decline in activity at the rate of 2.6 octane numbers per 1,000 hours.

In the fifty-fifth cycle, the catalyst produced an 88 CFR-R octane number product under the defined conditions. At the end of 1280 on-stream hours, the catalyst was subjected to mild oxidation as in the previous cycles, and was then treated with pure oxygen at 1080° F. for 24 hours according to our new regeneration procedure. The resulting oxidized catalyst was cooled rapidly to room temperature, reduced with hydrogen at 825° F., and again tested in the hydroforming operation. A C₅—400° F. product was obtained having a CFR-R octane number of 95.4, substantially as good as the product obtained with the fresh catalyst.

While we have described our invention with reference to certain specific embodiments thereof, it will be recognized that the said embodiments are illustrative only and not intended to be limitations as to the scope thereof. Our invention is applicable broadly to the regeneration of platinum and/or palladium-containing hydroforming catalysts, and it is to be understood that any modifications or equivalents that would ordinarily occur to one skilled in the art are to be considered as lying within the scope of our invention.

In accordance with the foregoing description, we claim as our invention:

1. A process for regenerating a platinum-group metal hydroforming catalyst, said catalyst having become deactivated during exposure to a hydrocarbon charging stock under hydroforming conditions, and containing not more than about 0.1 percent by weight of carbon deposited thereon, which comprises subjecting said catalyst to treatment with an oxidizing agent at a temperature between about 950 and 1300° F. under conditions effective to remove carbon therefrom and to convert a substantial proportion of said platinum-group metal into an oxide thereof, thereafter quenching said catalyst to a temperature substantially below the recrystallization temperature, 860° F., of platinum and of said oxide thereof, and subsequently contacting said catalyst with a hydrogen-containing gas at a temperature within the hydroforming range.

2. A process for regenerating a platinum-group metal hydroforming catalyst, said catalyst having become deactivated during exposure to a hydrocarbon charging stock under hydroforming conditions, and containing not more than about 0.1 percent by weight of carbon deposited thereon, which comprises subjecting said catalyst to treatment with an oxidizing agent at a temperature between about 950 and 1300° F. under conditions effective to remove carbon therefrom and to convert a substantial proportion of said platinum-group metal into an oxide thereof, thereafter quenching said catalyst to a temperature below about 500° F., and subsequently contacting said catalyst with a hydrogen-containing gas at a temperature within the hydroforming range.

3. A process for regenerating a platinum-containing hydroforming catalyst, said catalyst having become deactivated during exposure to a hydrocarbon charging stock under hydroforming conditions, and containing readily combustible carbonaceous material deposited thereon, which comprises removing said ready combustible carbonaceous material by preliminary oxidation and then contacting said catalyst with an oxygen-containing gas at a temperature between about 950 and 1300° F., whereby a substantial proportion of the platinum contained therein is converted to a platinum oxide, thereafter quenching said catalyst to a temperature below about 800° F., and subsequently contacting said catalyst with a hydrogen-containing gas at a temperature within the hydroforming range.

4. A process for regenerating a platinum-containing hydroforming catalyst, said catalyst having become deactivated during exposure to a hydrocarbon charging stock under hydroforming conditions which include temperatures in the range of 850 to 1000° F. and pressures in the range of 200 to 350 p.s.i.g., which process comprises contacting said catalyst with an oxygen-containing gas at a temperature between about 950 and 1300° F., whereby a substantial proportion of the platinum contained therein is converted to a platinum oxide, thereafter quenching said catalyst to a temperature below about 800° F., and subsequently contacting said catalyst with a hydrogen-containing gas at a temperature within the hydroforming range.

5. A process for regenerating a platinum-containing hydroforming catalyst, said catalyst having become deactivated during exposure to a hydrocarbon charging stock under hydroforming conditions, and containing not more than about 0.1 percent by weight of carbon deposited thereon, which comprises contacting said catalyst with an oxygen-containing gas at a temperature between about 950 and 1300° F., whereby said carbon is removed therefrom and a substantial proportion of the platinum contained therein is converted to a platinum oxide, thereafter quenching said catalyst to a temperature below about 800° F., and subsequently contacting said catalyst with a hydrogen-containing gas at a temperature within the hydroforming range.

6. A process for regenerating an alumina-supported platinum hydroforming catalyst, said catalyst having become deactivated and carbonized during exposure to a petroleum naphtha under low pressure hydroforming conditions, which comprises burning carbon therefrom at an average temperature between about 750 and 900° F. with a gas stream containing between about 0.5 and 10 percent of oxygen, contacting the carbon-depleted catalyst with an oxygen-containing gas at a temperature between about 950 and 1300° F., whereby residual carbon is removed therefrom and a substantial proportion of the platinum contained therein is converted into a platinum oxide, thereafter quenching said catalyst to a temperature below about 800° F., and subsequently contacting said catalyst with a hydrogen-containing gas at a temperature within the hydroforming range, whereby said platinum oxide is reduced and said catalyst is restored to active condition.

7. A process for regenerating a platinum-group metal hydroforming catalyst, said catalyst having become deactivated during exposure to a hydrocarbon charging stock under hydroforming conditions, and containing not more than about 0.1 percent by weight of carbon deposited thereon, which comprises subjecting said catalyst to treatment with an oxidizing agent at a temperature between about 950 and 1300° F. under conditions effective to remove carbon therefrom and to convert a substantial proportion of said platinum-group metal into an oxide thereof, thereafter quenching said catalyst in oxidizing agent to a temperature substantially below the recrystallization temperature, 860° F., of platinum and of said oxide thereof, and subsequently contacting said catalyst with a hydrogen-containing gas at a temperature within the hydroforming range.

8. A process for restoring the activity of an alumina-supported platinum-group metal hydroforming catalyst, said catalyst having become deactivated and contaminated with carbon deposits during exposure to hydrocarbon charging stock under hydroforming conditions and having subsequently been subjected to a preliminary oxidation to reduce the carbon content of the catalyst to a level not greater than about 0.1 percent by weight, which process comprises subjecting the catalyst after said preliminary oxidation to treatment with an oxidizing gas at a temperature between about 950 and 1300° F. under conditions to remove additional carbon from the catalyst and to convert a substantial proportion of the platinum-group metal into an oxide thereof, thereafter quenching said catalyst in an oxidizing gas to a temperature substantially below 860° F. and subsequently contacting said catalyst with a hydrogen-containing gas at a temperature within the hydroforming range.

9. The process of claim 8 wherein said quenching is effected by contacting the catalyst with a flowing stream of gas.

10. The process of claim 8 wherein the catalyst is a platinum-on-alumina catalyst containing between about .1 and 2 percent by weight of platinum.

11. The process of claim 9 wherein the rate of flow of said stream of gas is sufficiently high to effect the quenching in about 10 minutes.

12. The process of claim 10 wherein the catalyst contains a third component selected from the group consisting of fluoride and chloride in the amount of at least about .1 percent but less than about 10 percent by weight based on dry alumina.

References Cited in the file of this patent
UNITED STATES PATENTS

| | | |
|---|---|---|
| 2,150,270 | Durrans | Mar. 14, 1939 |
| 2,431,462 | Campbell et al. | Nov. 25, 1947 |
| 2,641,582 | Haensel | June 9, 1953 |
| 2,662,861 | Riblett | Dec. 15, 1953 |
| 2,664,404 | Blatz et al. | Dec. 29, 1953 |

UNITED STATES PATENT OFFICE

CERTIFICATE OF CORRECTION

Patent No. 2,879,232                                                 March 24, 1959

Russell V. Malo et al.

It is hereby certified that error appears in the printed specification of the above numbered patent requiring correction and that the said Letters Patent should read as corrected below.

Column 3, line 22, after "prepared" insert a period; column 5, line 25, for "treated" read -- treatment --; column 11, line 65, for "really" read -- readily --.

Signed and sealed this 10th day of May 1960.

(SEAL)
Attest:

KARL H. AXLINE                                          ROBERT C. WATSON
Attesting Officer                                      Commissioner of Patents